Jan. 2, 1923.                                                                    1,440,553
H. C. PRIVETT.
PUNCTURE CLOSING INNER TUBE FOR PNEUMATIC TIRES.
FILED SEPT. 23, 1920
FIG. 1.
FIG. 2.
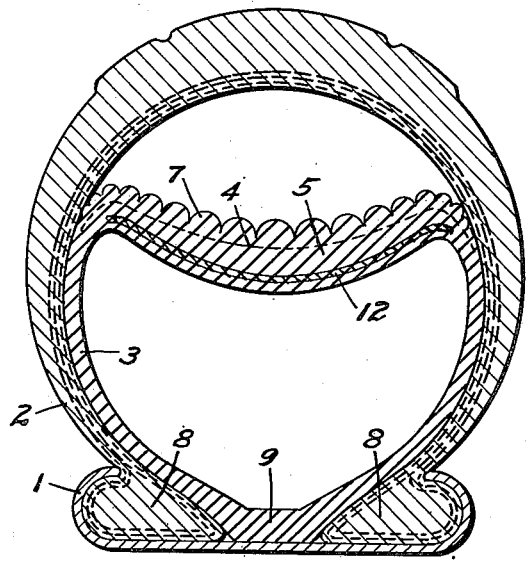
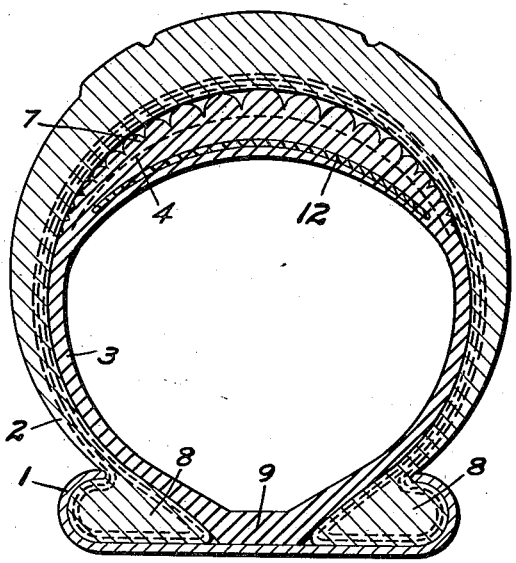
FIG. 3.
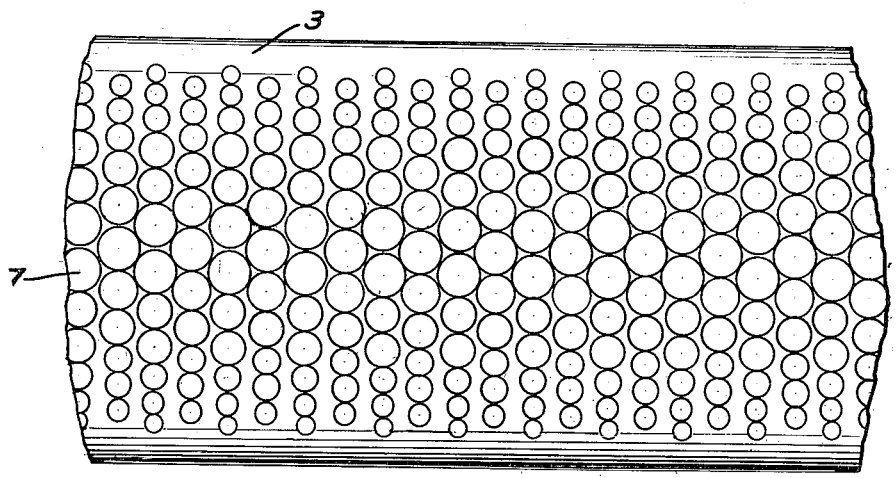
INVENTOR
HENRY C. PRIVETT
BY
*Hazard & Miller*
ATTORNEYS.

Patented Jan. 2, 1923.

1,440,553

UNITED STATES PATENT OFFICE.

HENRY C. PRIVETT, OF LONG BEACH, CALIFORNIA, ASSIGNOR OF ONE-HALF TO CHARLES R. PRIVETT, OF BURBANK, CALIFORNIA, THREE-SIXTEENTHS TO HELEN E. PRIVETT AND ONE-SIXTEENTH TO HOLLIS F. PRIVETT, BOTH OF LONG BEACH, CALIFORNIA.

PUNCTURE-CLOSING INNER TUBE FOR PNEUMATIC TIRES.

Application filed September 23, 1920. Serial No. 412,347.

*To all whom it may concern:*

Be it known that I, HENRY CLAUDE PRIVETT, a citizen of the United States, residing at Long Beach, in the county of Los Angeles and State of California, have invented new and useful Improvements in Puncture-Closing Inner Tubes for Pneumatic Tires, of which the following is a specification.

This invention relates to an inner tube for pneumatic tires, and has for its object the provision of an improved tread strip for inner tubes as well as an improved construction of the base portion of inner tubes. The improved base and tread portions of the inner tube may consist of layers of the material from which the inner tube is formed, built into the inner tube at the time of manufacture, or said improved base and tread portions of the tube may be readily applied to any ordinary inner tube.

It is the object of the improved tread portion of the inner tube to provide a tread strip which will eliminate friction between the casing of the tire and the inner tube, and thus prevent the inner tube sticking to the casing.

It is the object of the improved base portion of the tube to provide a thickened portion of said tube at the base which will eliminate the possibility of pinching the base portion of the inner tube between the sides of the tire casing. The thickened base portion of the inner tube will also provide a sufficient reinforcement at the portion of said tube which extends across the space between the sides of the tire casing, as to eliminate the necessity for the use of a usual annular flap covering this portion of the inner tube at the space between the sides of the tire casing.

The improved base and tread construction may be employed in the manufacture of an inner tube which is otherwise a usual construction. The improved base and tread construction is, however, particularly applicable to the manufacture of, or the use in connection with, an inner tube having a tread strip such as described and claimed in my co-pending application, Serial No. 377,574, filed April 29, 1920 for improved tread strips.

It will be understood that the inner tube having said improved tread strip, such as described and claimed in my aforementioned co-pending application, may either comprise an inner tube having said tread strip applied thereto during the manufacture of the inner tube, or said inner tube may consist of any ordinary tube having said improved tread strip applied thereto in any well known or preferred manner.

The invention will be readily understood from the following description of the accompanying drawings, in which Figure 1 is a transverse sectional view through a typical automobile wheel rim, tire, and inner tube, said inner tube being provided with a tread strip such as is covered by my co-pending application, and the inner tube being also constructed with the improved tread and base portions formed in accordance with the present invention, said inner tube being shown in deflated condition.

Fig. 2 is a similar view showing the inner tube in its inflated position.

Fig. 3 is a plan view of a portion of the tread of the inner tube.

In the drawings a typical automobile wheel rim is shown at 1, said rim being adapted to carry a tire casing 2 and an inner tube 3. The particular tire casing and the inner tube, aside from the construction of the tread and base portions of the inner tube, are merely shown as a typical casing and inner tube, and it will be understood that the invention is not limited or restricted in any way to use in connection with a tire casing of any particular size or construction, or an inner tube of any particular size or construction.

In the embodiment of the invention as illustrated, I have shown the improved tread and base construction for an inner tube employed in connection with an inner tube such as shown in my aforementioned co-pending application. This inner tube is provided with the annular tread strip 5 of live rubber or the like and having the layer 4 of non-extensible material embedded therein. The arrangement and operation of the parts as thus described will be readily understood from my said co-pending application.

In the present invention an exterior tread portion 7 is provided upon the inner tube. This tread portion is in the form of a plurality of protuberances which may be formed of relatively hard rubber or like wear resisting material. The protuberances extend over the entire tread portion of the inner tube and are, preferably, arranged in rows with the individual protuberances of adjacent rows arranged in staggered relation so as to leave a minimum of space between said protuberances. The protuberances are, preferably, of such size as to contact one against another and also, preferably, taper in size from the central portion of the tread surface toward the sides of said tread surface. The larger of said tapering protuberances are arranged at the central portion of the tread surface.

It will be understood that the protuberances, as thus described, may be either suitably formed as by vulcanizing or cementing upon a tread strip adapted to be applied to a previously constructed inner tube, or said protuberances may be formed upon a tread strip which is built up as one of the layers of the inner tube during the manufacture thereof. It will also be understood that the invention is not limited to the provision of protuberances mounted upon a tread strip, since it may be found expedient to mold or otherwise form the protuberances upon the inner tube.

When the inner tube is received within the tire casing the protuberances formed upon the tread surface of the inner tube will contact against the inner surface of the tire casing and thereby avoid all friction between the inner tube and the tire casing. The protuberances 7 being of relatively hard rubber or like resilient matter will resist the wear incident to the frictional contact between the same and the tire casing, and the life of the inner tube will thus be greatly prolonged.

The base portion of the inner tube which is received between the side bead portions 8 of the tire casing is shown at 9. This portion of the inner tube is of substantially greater thickness than the sides of the tube, said thickened portion gradually decreasing in thickness until it merges into the sides of the inner tube. The thickened portion of the inner tube between the beads 8 is thus of sufficient wear resisting quality to prevent the beads of the tire casing damaging the inner tube by pinching the same. The thickened portion 9 filling the space between the beads 8 also eliminates the necessity of employing a usual annular flap for closing said space. The thickened portion 9 may be incorporated in the inner tube during manufacture of the same by increasing the number of layers of material forming the inner tube at this portion of the same, or said thickened portion of the inner tube may be formed by applying extra layers of material to the base of a tube having a usual base. Such extra layers of material may be secured to the ordinary inner tube by any well known vulcanizing process or the like.

The inner tube as thus constructed may be provided with a puncture closing sheet embedded within the tread portion of the tube. Such a sheet is shown at 12. This sheet may be formed by compounding a plastic material and forming a sheet of said material. This sheet is then embedded in the tire tread and is, preferably, vulcanized so as to form an integral structure with the tube. The compound of which this sheet is formed is one which will quickly close any puncture occurring in the same, and as a consequence should the tube be punctured this protecting sheet embedded in the tube will automatically close said puncture.

The compound of which the protecting sheet is formed may be made according to the following formula:

| | |
|---|---|
| Beeswax | 7% |
| Gum rubber | 13% |
| Bone glue | 40% |
| Sulphur | 25% |
| Zinc oxide | 15% |

The various ingredients of the compound may be mixed and kneaded then formed into sheets of the desired size and thickness in any suitable manner.

Various changes may be made without departing from the spirit of the invention as claimed.

What is claimed is:

1. An inner tube having solid and rounded protuberances formed on and projecting outwardly from the tread thereof when the tube is inflated.

2. An inner tube having resilient semispherical protuberances formed on and projecting outwardly from the tread thereof when the tube is inflated which increase in size from the opposite edges of the tread.

3. An inner tube having a relatively thick tread portion, resilient semispherical protuberances on the outer surface of the tread portion, and a puncture closing sheet embedded within the tread portion.

4. An inner tube having solid and rounded protuberances formed on and projecting outwardly from the tread thereof when the tube is inflated, said protuberances increasing in size from the opposite edges of the tread.

In testimony whereof I have signed my name to this specification.

HENRY C. PRIVETT.